(12) United States Patent
Korus et al.

(10) Patent No.: US 8,561,925 B2
(45) Date of Patent: Oct. 22, 2013

(54) LATERAL IRRIGATION SYSTEM WITH Z-FOLD SPANS

(75) Inventors: Thomas J. Korus, Lindsay, NE (US); Jochen Pfrenger, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 255 days.

(21) Appl. No.: 13/194,432

(22) Filed: Jul. 29, 2011

(65) Prior Publication Data

US 2013/0026260 A1 Jan. 31, 2013

(51) Int. Cl.
*B05B 3/00* (2006.01)

(52) U.S. Cl.
USPC ............................... 239/729; 239/730

(58) Field of Classification Search
USPC ................ 239/729, 730, 732, 722, 741
See application file for complete search history.

(56) References Cited

U.S. PATENT DOCUMENTS

| | | | | |
|---|---|---|---|---|
| 3,802,627 | A | * | 4/1974 | Seckler et al. .............. 239/729 |
| 4,432,494 | A | * | 2/1984 | Hunter ........................ 239/729 |
| 4,569,481 | A | | 2/1986 | Davis et al. |
| 4,674,681 | A | | 6/1987 | Meis et al. |
| 5,695,129 | A | | 12/1997 | Korus |
| 6,095,439 | A | | 8/2000 | Segal et al. |
| 6,726,132 | B2 | * | 4/2004 | Malsam ....................... 239/729 |
| 2006/0289676 | A1 | | 12/2006 | Korus |
| 2007/0267524 | A1 | | 11/2007 | Mack |

* cited by examiner

*Primary Examiner* — Davis Hwu
(74) *Attorney, Agent, or Firm* — Hovey Williams LLP (57) ABSTRACT

A lateral irrigation system comprising a plurality of towers and a plurality of lateral structures extending between and connected to the towers. The support structures may comprise a first support structure, a second support structure pivotable relative to the first support structure, and a third support structure pivotable relative to the second support structure. The irrigation system may also comprise a fluid delivery system having conduits attached to or extending through the support structures and configured to output water from orifices formed therein. The irrigation system may further comprise joints at which the second and third support structures may pivot. The second and third support structures may be configured to pivot into a substantially zig-zag or "Z"-shaped configuration relative to the first support structure.

7 Claims, 4 Drawing Sheets

LATERAL IRRIGATION SYSTEM WITH Z-FOLD SPANS

BACKGROUND

Embodiments of the present invention relate to a system and method for irrigating irregular-shaped agricultural fields.

Irrigation systems are frequently used to deposit water and/or pesticides throughout a field of crops. Center pivot irrigation systems move in a circle or semi-circle about a central pivot while lateral irrigation systems are configured to move along a generally straight line across a square or rectangular-shaped field.

Lateral irrigation systems can not fully irrigate irregular shaped fields or fields with portions that are too narrow for passage of the lateral irrigation system. Furthermore, lateral irrigation systems that use a canal as a water source cannot fully irrigate fields when the canal is not parallel with a boundary of the field, because the irrigation systems generally move substantially parallel to the canal. Therefore, if the canal is positioned or naturally oriented at a diagonal angle relative to an otherwise rectangular field, the lateral irrigation system moving parallel to the canal will move substantially diagonally across the field and therefore miss some corner portions of the field.

Accordingly, there is a need for a lateral irrigation system that overcomes the limitations of the prior art.

SUMMARY

Embodiments of the present invention solve the above described problems by providing a lateral move irrigation system that more effectively irrigates irregular-shaped fields. An embodiment of the present invention includes a lateral move irrigation system comprising a plurality of laterally-movable towers, a plurality of support structures each connected to and spanning a distance between adjacent once of the towers, a fluid delivery system, and a plurality of joints each pivotally joining two of the support structures with each other. The towers may be configured to travel across a field in a lateral direction. The fluid delivery system may comprise conduits attached to or extending through the support structures and configured to output water from orifices formed therein. The lateral move irrigation system may also comprise a control system configured to pivot a plurality of the support structures at one or more locations of the field that are not passable when all of the support structures are laterally aligned with each other to thereby decrease an effective length of the irrigation system to permit passage of at least a portion of the irrigation system.

Another embodiment of the present invention includes a lateral move irrigation system comprising a plurality of towers, a first support structure, a second support structure, and a third support structure. The first support structure may span a distance between adjacent ones of the towers, the second support structure may extending between and pivotally connect to at least two of the towers, and the third support structure may pivotally connect at least one of the towers. The towers may be configured to travel across a field in a lateral direction. The lateral move irrigation system may further comprise a fluid delivery system having conduits attached to or extending through the support structures and configured to output water from orifices formed therein. The lateral move irrigation system may comprise a sensing device and a control system communicably coupled with the sensing device. The sensing device may be fixed relative to at least one of the towers and configured to sense its geographic coordinates or one or more field boundaries. The control system may be configured to pivot the second and third support structures toward each other and toward the first support structure in response to signals received from the sensing device at one or more locations of a field that are not passable by the irrigation system when all of the support structures are laterally aligned with each other to thereby decrease an effective length of the irrigation system to permit passage of at least a portion of the irrigation system.

In yet another embodiment of the present invention, a lateral move irrigation system may comprise a main section having a first end and a second end. The main section may comprise a plurality of main towers and a plurality of main support structures spanning from the first end to the second end of the main section. Each of the main support structures may be attached to at least one of the main towers. The main towers may be configured to travel across a field in a lateral direction. The lateral move irrigation system may further comprise a first end section, a second end section, and a fluid delivery system comprising one or more conduits attached to or extending through the support structures and first and second end sections. The fluid delivery system may be configured to output water from orifices formed therein. The first end section may specifically comprise a first pivotable support structure pivotally attached to one of the main support structures at the first end of the main section and a second pivotable support structure pivotally attached to the first pivotable support structure. The second end section may specifically comprise a third pivotable support structure pivotally attached to one of the main support structures at the second end of the main section, and a fourth pivotable support structure pivotally attached to the third support structure. The lateral move irrigation system may further comprise a first sensing device, a second sensing device, and a control system communicably coupled with the sensing devices. The first sensing device may be connected at or proximate to the first end and may be configured to sense its geographic coordinates or one or more field boundaries. The second sensing device may be connected at or proximate to the second end section and configured to sense its geographic coordinates or one or more field boundaries. The control system may be configured to pivot the first and second pivotable support structures in response to signals received from the first sensing device at one or more locations of a field that are not passable by the irrigation system when at least one of the first and second pivotable support structures are laterally aligned with the main support structures. The control system may also be configured to pivot the third and fourth pivotable support structures in response to signals received from the second sensing device at one or more locations of the field that are not passable by the irrigation system when at least one of the third and fourth pivotable support structures are laterally aligned with the main support structures. Pivoting of the first, second, third, and/or fourth pivotable support structures may decrease an effective length of the irrigation system to permit passage of at least a portion of the irrigation system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
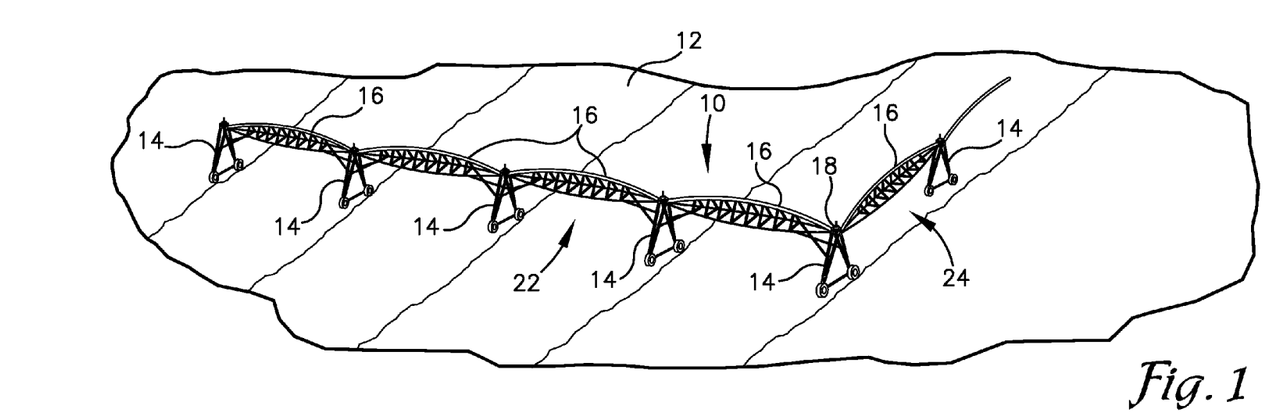
FIG. 1 is a perspective view of a lateral irrigation system constructed in accordance with an embodiment of the invention.
Figure 2:
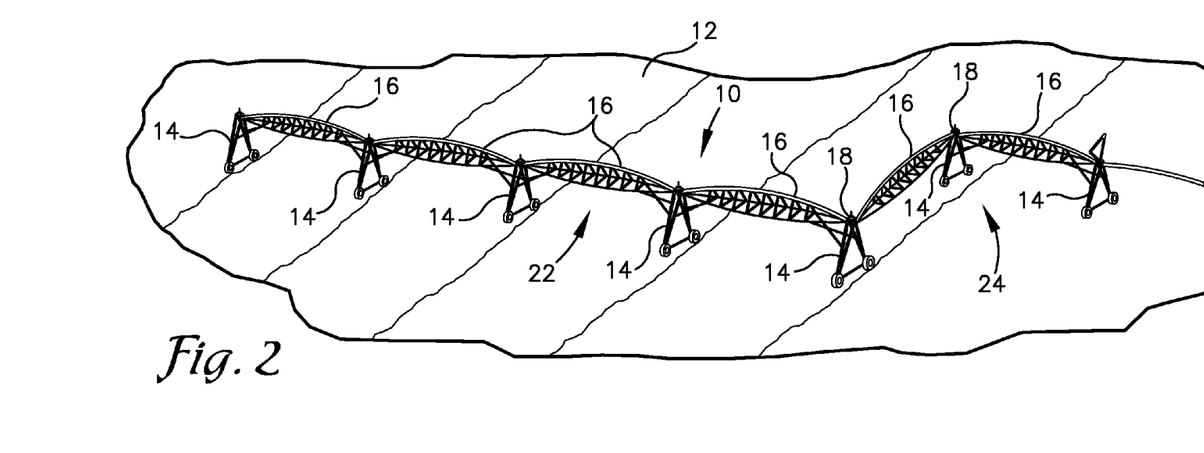
FIG. 2 is a perspective view of a lateral irrigation system constructed in accordance with another embodiment of the invention.
Figure 3:
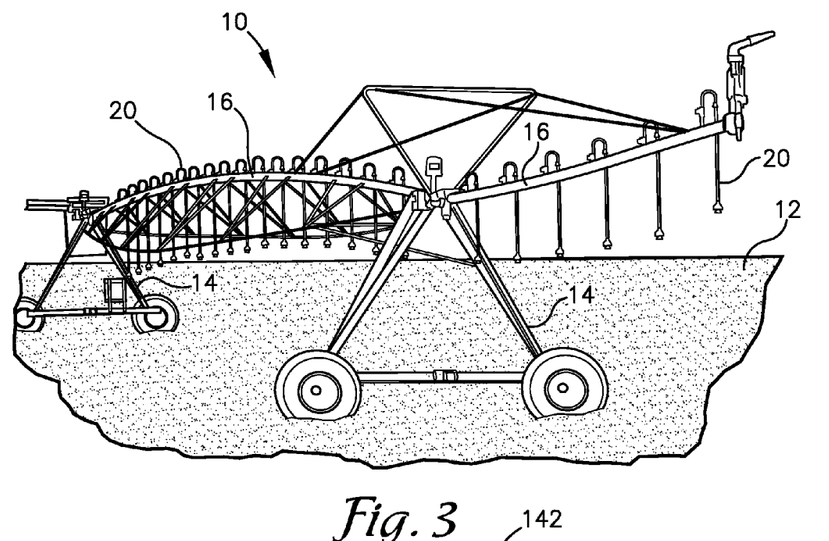
FIG. 3 is a partial perspective view of the lateral irrigation system of FIG. 1.

Embodiments of the present invention, as illustrated in FIGS. 1-3, include an irrigation system 10 configured for irrigating a field 12. The irrigation system 10 may comprise a laterally-movable main section 22 and at least one end section 24 pivotable relative to the main section 22. The main and/or end sections 22,24 of the irrigation system 10 may comprise a plurality of towers 14 and a plurality of support structures 16 extending from and/or interlinking the towers 14, one or more joints 18 pivotally connecting at least one of the support structures 16 relative to another of the support structures 16 and/or one of the towers 14, and a fluid delivery system 20, as illustrated in FIG. 3, through which water or other liquids are delivered to the field 12. The irrigation system 10 may also comprise a control system and/or various sensors configured for guiding the irrigation system 10 and actuating the joints 18 according to various parameters provided to or stored within the control system, as later described herein.

The main section 22 of the irrigation system 10 may comprise any plurality of towers 14 and support structures 16 interconnected with each other. The main section 22 may be similar or identical in configuration and operation to a traditional lateral irrigation system for laterally moving across the field 12 during irrigation. The main section 22 may have a first end and a second end, with the towers 14 and associated support structures 16 laterally spanning a distance between the first end and the second end.

The end sections 24 may comprise a first end section 24 and/or a second end section. Specifically, the first end section 24 may be pivotably attached at the first end of the main section 22 and/or the second end section may be attached at the second end of the main section 22. The first and/or second end sections 24 may comprise at least one of the towers 14, support structures 16, and/or the joints 18 listed above. For example, at least one of the support structures 16 of the first end section 24 may be pivotally attached to another one of the support structures 16 of the first end section 24 and/or one of the support structures 16 of the main section 22. Likewise, one of the support structures 16 of the second end section may be pivotally attached to another one of the support structures 16 of the second end section and/or one of the support structures 16 of the main section 22.

The irrigation system 10 may include any number of the towers 14, each of which may comprise a frame of any shape and one or more wheels rotatably attached to the frame. In some embodiments of the invention, the frame of at least some of the towers 14 may be made of one or more rods shaped in a substantially triangular or A-frame configuration having lower leg portions configured for attaching the wheels thereto. Additionally or alternatively, the frame of at least some of the towers 14 may be made of one or more rods shaped in a substantially narrow rectangular shape with leg portions extending horizontally outward and then angled downward therefrom for attaching the wheels thereto.

The wheels illustrated and described herein are merely examples of mechanisms for permitting movement of the irrigation system 10. The term "wheel" or "wheels" as used herein may refer to conventional circular wheels, skis, skids, tank tracks and wheels, rollers on a track, or any mechanism on which the towers 14 may travel forward or aft relative to the ground. The wheels may be actuated by one or more motors and/or other actuation devices. In some embodiments of the invention, the motors may include integral or external relays so they may be turned on, off, and/reversed. The motors may also have several speeds or bet equipped with variable speed drives. Furthermore, one or more of the towers 14 may also comprise a power supply, a traveling winch, and/or other various actuation components configured for actuating the towers 14 in a lateral direction across the field 12. For example, the gear motor may be coupled with various a drive shaft, gears, belts, chains, sprockets, etc. to rotatably couple the gear motor with the wheels.

Although not required, some or all of the towers 14 may be equipped with steerable wheels pivoted about upright axes by suitable steering motors, allowing the towers to pivot one or more of the support structures 16 relative to others of the support structures 16 about one of the joints 18, as later described herein. U.S. Pat. No. 4,508,269 in the name of Davis et al. is hereby incorporated by reference in its entirety into the present specification for a disclosure of ground drive motors and steering motors associated with an irrigation machine. As is also well known, the drive motors for the towers 14 may be controlled by a suitable safety system such that they may be slowed or completely shut down in the event of the detection of an adverse circumstance, all of which is disclosed, for example, in U.S. Pat. No. 6,042,031 to Christensen et al., incorporated herein by reference in its entirety.

The irrigation system 10 may include any number of the support structures 16, each spanning a distance between adjacent ones of the towers 14, as illustrated in FIGS. 1-3. Each of the support structures 16 may be fixedly or pivotally connected with at least one of the towers 14 and/or each other to form a number of interconnected spans. In some embodiments of the invention, the support structures 16 may be elongated rigid truss structures, booms, conduits pipes, bars, extension arms, or other structures of various configurations. However, the support structures 16 may have any shapes and dimensions without departing from the scope of the invention. In some embodiments of the invention, one or more of the support structures 16 may be an extension arm having a first end fixedly or pivotally joined with one of the towers 14 and a second end not joined to the towers 14 or substantially free standing, as illustrated in FIG. 3.

The support structures 16 may carry or otherwise support portions of the fluid delivery system 20. Specifically, portions of the fluid delivery system 20 may attach to and/or be supported by the support structures 16, such that water and/or any other liquid may be dispensed at given intervals along a length of the support structures 16. A plurality of sprinkler heads, spray guns, drop nozzles, or other fluid-emitting devices may be spaced along the support structures 16 and/or at one or more of the towers 14 to apply water and/or other fluids to land underneath the irrigation system 10.

In some embodiments of the invention, the support structures 16 may be integrated with the fluid delivery system 20. For example, each of the support structures 16 may comprise rigid pipes or conduits which span two of the towers 14 and are in fluid communication with a water source, such that water may flow through therethrough. In this embodiment of the invention, the support structures 16 may also comprise inlets and outlets for dispensing water or any other liquid desired to be applied to the field 12.

The joints 18 may be any articulating pivot joints, hinge joints, rotary joints, or other mechanisms operable to pivot a first component thereof relative to a second component. Specifically, the joints 18 may comprise any quantity of joints pivotally joining two of the support structures 16 with each other. In some embodiments of the invention, a first component of one of the joints 18 may be fixed relative to or integral with one of the towers 14 and a second component of one of the joints 18 may be fixed relative to or integral with one of the support structures 16, making that support structure 16 pivotal or rotatable relative to the corresponding tower 14. The joints 18 may be configured to rotate the support structures 16 in a substantially horizontal plane. In some embodiments of the invention, the joints 18 may be configured to allow one or more of the support structures 16 to pivot or rotate in both a clockwise and counterclockwise direction to within a 15-degree angle of another of the support structures 16. For example, the joints 18 may allow one of the support structures 16 to pivot or rotate approximately 330-degrees relative to an adjacent one of the support structures. However, the joints 18 may allow any degree of pivoting or rotation without departing from the scope of the invention.

In some embodiments of the invention, the joints 18 may comprise or be mechanically coupled with an actuation device configured to receive signals from the control system and to pivot the joints 18 at a time and by an amount indicated by the control system, as described below. Additionally or alternatively, the wheels of one or more of the towers 14 may be steerable, as described above, such that steering the wheels of one of the towers 14 may cause one of the support structures 16 to pivot at one of the joints 18.

As illustrated in FIG. 3, the fluid delivery system 20 may comprise one or more conduits and one or more fluid-emitting devices, such as sprinkler heads, drip holes formed in the conduits, spray nozzles, or other fluid emitters. Each of the fluid-emitting devices may be fixed to one of the towers 14, the support structures 16, or any location to the irrigation system 10. At least one of the fluid-emitting devices may comprise and/or be fluidly connected to a supply/shut-off valve for turning water on and off to the fluid-emitting devices and controlling how much water is provided to the fluid-emitting devices. The supply/shut-off valve may be actuated manually, electronically, remotely, and/or automatically by the control system, which may be physically and/or communicably coupled with the supply/shut-off valve.

The conduits may be hoses or pipes fluidly linking the fluid-emitting devices with a fluid supply or source. A pump or any other actuation means may be used to force water or another fluid through the conduits to the fluid-emitting devices. In some embodiments of the invention, the conduits may further comprise a drop pipe fluidly connected to the conduits to allow for a drain and flushing of fluid in the conduits. Furthermore, in some embodiments of the invention, the support structures 16 may also serve as one or more of the conduits of the fluid delivery system 20.

Figure 5:
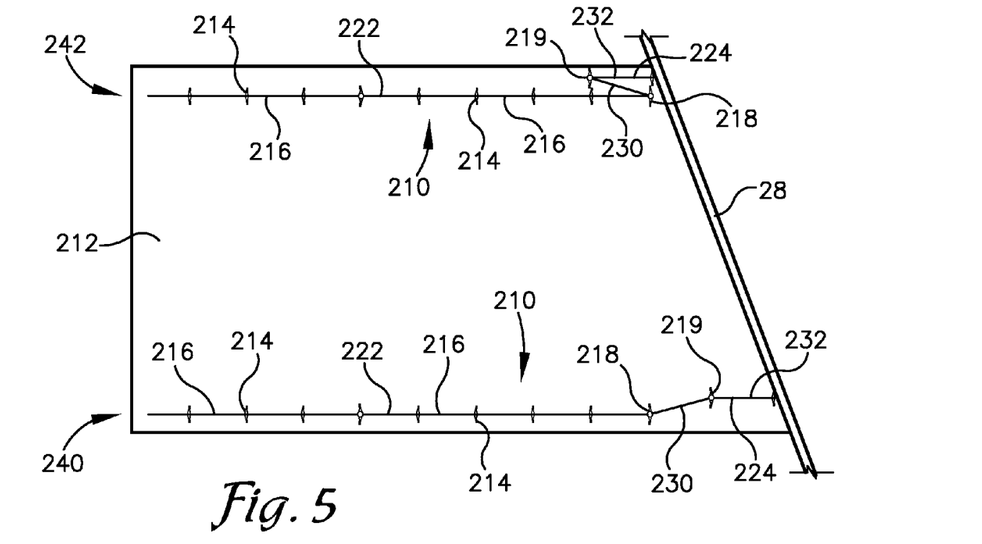
FIG. 5 is a top schematic view of the lateral irrigation system of FIG. 2, shown first at a starting point and then at an ending point in a field having an adjacent cannel positioned at a non-right angle relative to the field.

In some embodiments of the invention, a plurality of fluid supplies and/or supply hook-ups, such as hydrants, may be located at various locations relative to the field, and the conduits may be configured to attach to the nearest one of the fluid supplies. In another embodiment of the invention, the fluid supply may be a water canal 28, as illustrated in FIG. 5, or any other fluid source extending along a length of the field. In this embodiment of the invention, the fluid delivery system 20 may also comprise a pump configured to pump water from the canal 28 through the conduits.

The control system may be communicably coupled with motors or actuation devices of the wheels or joints 18, the sensors, and/or the fluid delivery system 20 and may be configured for controlling speeds of the towers 14, pivoting of the support structures 16, turning water on or off, etc. The control system may comprise any number of processors, controllers, integrated circuits, programmable logic devices, or other computing devices and resident or external memory for storing data and other information accessed and/or generated by the irrigation system 10. However, in alterative embodiments of the invention, the control system may simply comprise on/off switches and no memory elements. The control system may be physically located on one of the towers 14 or remotely located and configured to transmit control signals to various motors, switches, and/or actuation devices of the irrigation system 10.

The control system may implement a computer program and/or code segments to perform the functions and method described herein. The computer program may comprise an ordered listing of executable instructions for implementing logical functions in the control system. The computer program can be embodied in any computer readable medium for use by or in connection with an instruction execution system, apparatus, or device, and execute the instructions. In the context of this application, a "computer readable medium" can be any physical apparatus that can contain, store, communicate, propagate, or transport the program for use by or in connection with the instruction execution system, apparatus, or device. The computer readable medium can be, for example, but not limited to, an electronic, magnetic, optical, electro magnetic, infrared, or semi conductor system, apparatus, or device. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM).

The memory may be integral with control system, stand alone memory, or a combination of both. The memory may include, for example, removable and non removable memory elements such as RAM, ROM, flash, magnetic, optical, USB memory devices, and/or other conventional memory elements. The memory may store various data associated with the operation of the irrigation system 10, such as the computer program and code segments mentioned above, or other data for instructing irrigation system 10 to perform the steps described herein. Furthermore, the memory may store, for example, field sizes, geographic coordinates of field boundaries, amounts of water or liquid to dispense, sequence/timing and parameters for actuating the support structures 16 to pivot, etc. The various data stored within the memory may also be associated within one or more databases to facilitate retrieval of the information.

The sensors may include any sensor configured to detect a buried wire indicating a field boundary or, alternatively, an antenna configured to receive information about the sensor's geographic coordinates (such as a GPS receiver). For example, a GPS receiver may be mounted on one of the towers 14 or joints 18 and may send its geographic coordinates to the control system. The control system may compare the geographic coordinates with parameters stored in its memory to determine where the irrigation system 10 is in the field 12 and how far away the sensor is from the field boundaries. The control system may use this information to determine if any of the support structures 16 should be actuated to prevent one or more of the support structures 16 from crossing a field boundary and/or actuated to extend to cover a portion of the field that would not otherwise be covered by the irrigation system 10 in its previous configuration. In some embodiments of the invention, a wire may be buried next to the canal 28, and if the sensor is within a given proximity of the wire, at least one of the joints 18 or steerable wheels may be actuated (via a command signal from the control system) to pivot or rotate one of the support structures 16 away from the wire. Conversely, if the sensor's signal indicates that it is too far away from the buried wire, the control system may command one of the support structures 16 to be pivoted to extend toward the field boundary. Furthermore, in some embodiments of the invention, the control system may be configured to command one of the support structures 16 to pivot toward the main section 22 if the corresponding sensor is less than a predetermined distance from the field boundaries and to pivot away from the main section 22 if the sensor is greater than a predetermined distance from the field boundaries.

The control system, memory, and/or sensors may be separately housed or jointly enclosed in or supported on a weatherproof housing for protection from moisture, vibration, and impact. The housing may be constructed from a suitable vibration- and impact-resistant material, such as, for example, plastic, nylon, aluminum, or any combination thereof and may include one or more appropriate gaskets or seals to make it substantially waterproof or resistant. The housing may be positioned anywhere on the irrigation system 10.

In some embodiments of the invention, portions of the control system and/or memory may be remotely located from the towers 14, support structures 16, and fluid delivery system 18 of the irrigation system 10. Furthermore, portions of the control system, memory, and/or sensors need not be physically connected to one another since wireless communication among the various depicted components is permissible and intended to fall within the scope of the present invention.

The towers 14, support structures 16, and the joints 18 may be arranged in a variety of configurations. For example, as illustrated in FIG. 1, one of the support structures 16 may have a first end pivotally connected to one of the towers 14 via one of the joints 18, such that the support structure may be rotated in a substantially horizontal plane. In this configuration, the remaining support structures 16 may each be fixedly connected in substantially lateral alignment with each other. For example, one of the joints 18 may allow one or more of the support structures 16 of the first end section 24 or of the second end section, to be pivoted relative the main section 22, thereby allowing irrigation of an irregular shaped field.

In another embodiment of the invention, as illustrated in FIG. 2, two adjacent ones of the support structures 16 may be pivotable relative to each other and pivotable relative to the main section 22 of the irrigation system 10. Specifically, the configuration illustrated in FIG. 2 has a first pivotable one of the support structures 16 pivotally joined with a non-pivoting one of the support structures 16 and a second pivotable one of the support structures 16 pivotally joined with the first pivotable one of the support structures 16. For example, the first pivotable one of the support structures 16 may be actuated to pivot in a first direction and the second one of the support structures 16 may be actuated to pivot in a second direction. The actuation may occur simultaneously or independently, and the first and second direction may be the same direction or different directions, depending on the size and shape of the field 12. For example, as illustrated in FIG. 2, the first pivotable one of the support structures 16 may be pivoted in a counter-clockwise direction while the second pivotable one of the support structures 16 may be pivoted in a clockwise direction, thereby folding or unfolding these support structures 16 relative to each other.

Figure 4:
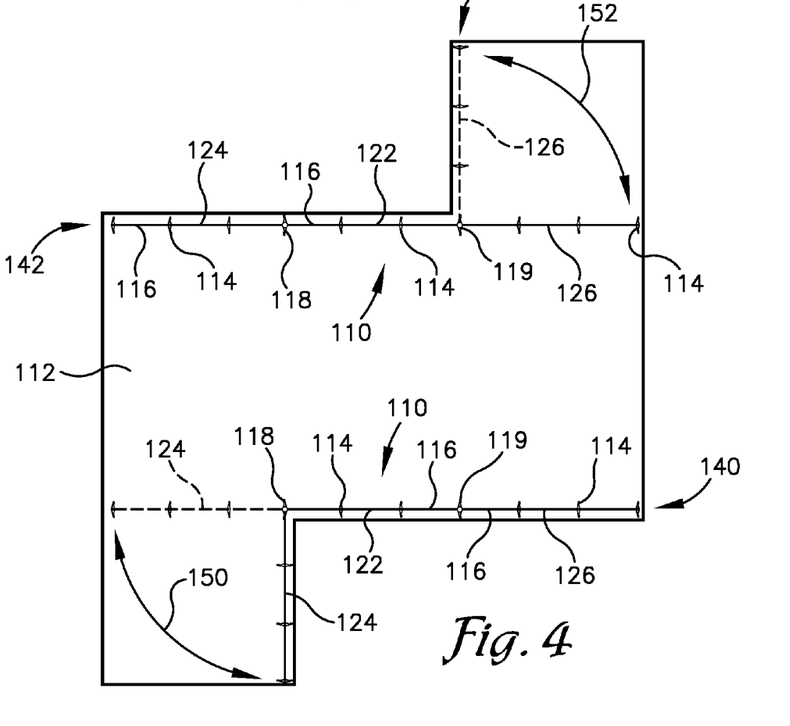
FIG. 4 is a top schematic view of the lateral irrigation system of FIG. 1, shown first at a starting point and then at an ending point in a field having irregularly-shaped start and end boundaries.

FIG. 4 illustrates another example embodiment of the invention in which an irrigation system 110 is configured to irrigate a field 112 having a large rectangular portion and two smaller, substantially square portions extending from opposing ends of the rectangular portion proximate to opposing sides of the rectangular portion of the field 112. Note that the irrigation system 110 has similar components and operates in the same manner as the irrigation system 10 described in detail above.

Specifically, the irrigation system 110 may comprise a plurality of towers 114, having a frame and wheels as described above in reference to towers 14. The irrigation system 110 may also comprise a main section 122, having the same characteristics as described above in reference to the main section 22. The irrigation system 110 may also comprise a first end section 124 and a second end section 126, having the same characteristics as the first end section 24 and the second end section described above. In some embodiments of the invention, the first and second end sections 124,126 may be comprised of a plurality of support structures 116 connected with each other and transported across the field 112 by a plurality of the towers 114. The irrigation system 110 may also comprise a first joint 118 and a second joint 119 having the same characteristics and capabilities as the joints 18 described above. Specifically, the first joint 118 may be configured to allow the first end section 124 to pivot relative to the main section 122 and the second joint 119 may be configured to allow the second end section 126 to pivot relative to the main section 122.

When located at a starting point 140 of the field 112, as illustrated in FIG. 4, the irrigation system 110 may be in a first configuration in which the first end section 124 is substantially perpendicular relative to the main section 122 and the second end section 126. To irrigate the field 112, the first end section 124 may be pivoted in a clockwise direction into lateral alignment with the main and second end sections 122, 126 via the first joint 118, as indicated by arrow 150. Once the first end section 124 is in lateral alignment with the main and second end sections 122,126, then all of the towers 114 may be actuated to move laterally across the field 112. Once the irrigation system 110 reaches an end of the rectangular portion of the field 112, the second end section 126 may be actuated to pivot via the second joint 119 in a counter-clockwise direction, as indicated by arrow 152, toward an ending point 142 of the field 112. When the second end section 126 reaches the ending point 142 of the field 112, the second end section 126 may be substantially perpendicular relative to the first end section 124 and the main section 122, as illustrated in FIG. 4. The irrigation system 110 may dispense water or other liquids throughout its movement across the field 112. As described above, the control system may be used to perform any of the irrigating steps described above for the irrigation system 110.

FIG. 5 illustrates a second example embodiment of the invention in which an irrigation system 210 is configured to irrigate a field 212 that is substantially quadrilateral with at least two corners thereof that are not right angles. For example, the field 212 may be intersected by the canal 28 used as a water source, and the canal 28 may not be parallel or perpendicular with the field 212, thus creating an irregular shape, as illustrated in FIG. 5. Note that the irrigation system 210 has similar components and operates in the same manner as the irrigation system 10 described in detail above.

Specifically, the irrigation system 210 may comprise a plurality of towers 214 each having a frame and wheels as described above in reference to towers 14. The irrigation system 210 may also comprise a plurality of support structures 216 having the same characteristics as the support structures 16 described above. Specifically, the irrigation system 210 may comprise an main section 222 comprise a plurality of the support structures 216 fixed in a lateral configuration with each other, and a first end section 224 having a first pivotable support structure 230 and a second pivotable support structure 232. The pivotable support structures 230,232 may have the same characteristics as the support structures 16 described above and may each be pivotally attached to each other and/or one of the other support structures 216. The irrigation system 210 may also comprise a first joint 218 and a second joint 219 having the same characteristics and capabilities as the joints 18 described above.

FIG. 5 illustrates the irrigation system 210 at a starting point 240 and at an ending point 242 of the field 212. At the starting point 240, the first pivotable support structure 230 is at a slight angle relative to the main section 222 and the second pivotable support structure 232. For example, as illustrated in FIG. 5, the first pivotable support structure 230 may start out pivoted at an angle between zero and 90 degrees relative to the support structures 216 of the main section 222. The second pivotable support structure 232 may be in a pivoted position relative to the first pivotable support structure 230 by an amount that keeps the second pivotable support structure 232 in an alignment substantially parallel with the support structures 216 of the main section 222.

As the irrigation system 210 moves laterally across the field 212 from the starting point 240 to the ending point 242, the first pivotable support structure 230 may be pivoted at the first joint 218 in a substantially counter-clockwise direction while the second pivotable support structure 232 is pivoted at the second joint 219 in a substantially clockwise direction. This allows the second pivotable support structure 232 to remain in a substantially parallel alignment with the support structures 216 of the main section 222 throughout the length of the field 212, with the pivoting of the first pivotable support structure 230 serving to shorten the span of the irrigation system 210 as it crosses the field 212. At the ending point 242, the first and second pivotable support structures 230,234, along with the support structure 216 of the main section 222 pivotally attached to the first pivotable support structure 230, may form a substantially "Z" shaped configuration, as illustrated in FIG. 5.

Figure 6:
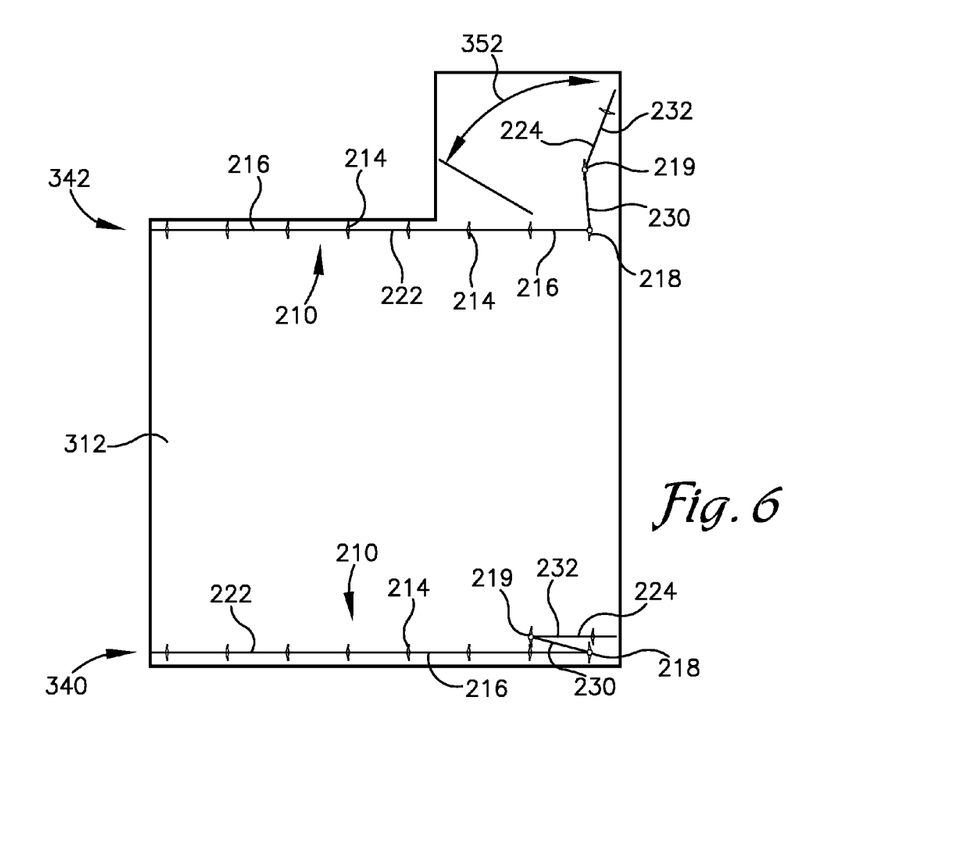
FIG. 6 is a top schematic view of the lateral irrigation system of FIG. 2, shown first at a starting point and then at an ending point in a field having an irregularly-shaped end boundary and a width shorter than a length of the fully extended lateral irrigation system.
Figure 7:
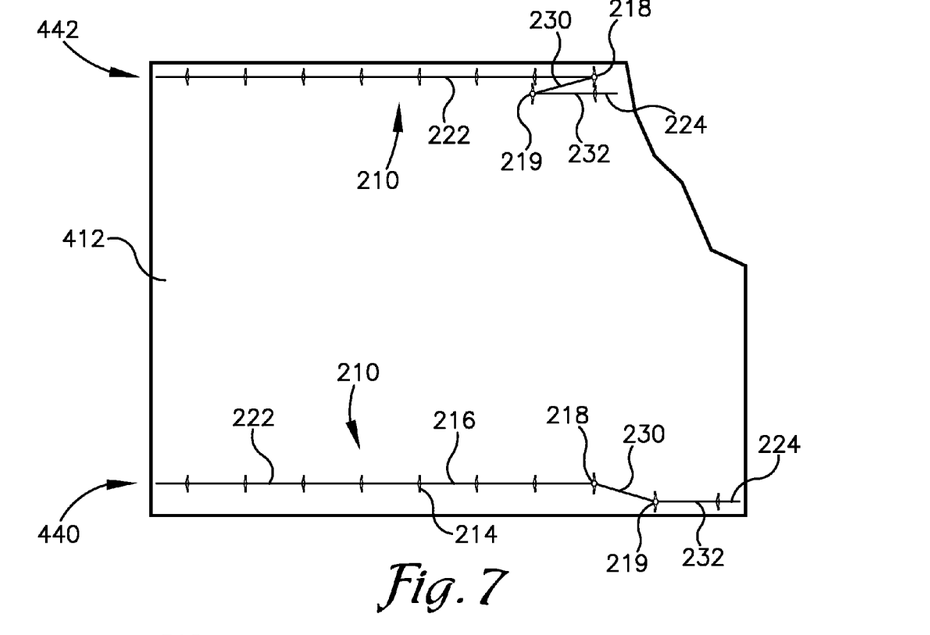
FIG. 7 is a top schematic view of the lateral irrigation system of FIG. 2, shown first at a starting point and then at an ending point in a field having an irregularly-shaped right boundary.

FIGS. 6-7 also illustrate different shaped fields that can be covered with the irrigation system 210 of FIG. 5. For example, FIG. 6 illustrates irrigation of a field 312 having a large rectangular portion and a smaller square portion extending beyond on end of the large rectangular portion. FIG. 6 also illustrates the irrigation system 210 at both a starting point 340 and an ending point 342. Due to a short width of the field 312, the first and second pivotable support structures 230,232 may remain in the substantially "Z" shaped or folded configuration as the irrigation system 210 is moved across the large rectangular portion of the field 312 and then the first and second pivotable support structures 230,232 may pivot in opposite directions at the first and second joints 218,219 to an unfolded or partially unfolded configuration. In the unfolded or partially unfolded configuration, the first pivotable support structure 230 and/or the second pivotable support structure 232 may be pivoted at their respective joints 218,219 back toward the support structures 216 of the main section 222 in such a way as to cover the smaller square portion of the field 312 extending beyond the large rectangular portion of the field 312. For example, the first and second pivotable support structures 230,232 may be partially unfolded relative to each other and pivoted clockwise away from the main section 222 until an end of the second pivotable support structure 232 extends to a corner of the smaller square portion of the field 312. Then the first pivotable support structure 230 may be pivoted in a counter-clockwise direction, as illustrated by arrow 352 in FIG. 6.

FIG. 7 illustrates irrigation of a field 412 with the irrigation system 210, and also illustrates the irrigation system 210 at both a starting point 440 and an ending point 442 of the field 413. The field 412 is substantially rectangular except for an irregular pattern jutting inward at one corner of the field 412. To cover the field 412, the irrigation system 210 may cooperatively actuate the first and second pivotable support structures 230,232 to maintain a distal end of the first end section 224 within a boundary of the field 412. As described above, the control system may use various sensors to determine the location of a particular portion of the irrigation system 210 and actuate the pivotable support structures 230,232 accordingly.

Figure 8:
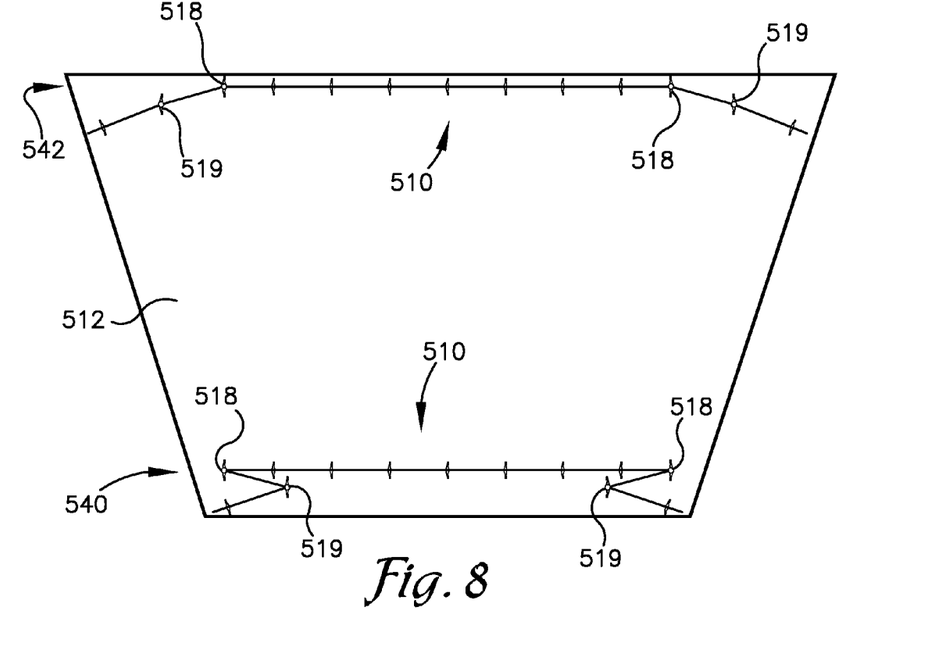
FIG. 8 is a top schematic view of the lateral irrigation system of FIG. 2, shown first at a starting point and then at an ending point in a generally trapezoidal-shaped field.

FIG. 8 illustrates another example embodiment of the invention in which an irrigation system 510 is configured to irrigate a field 512 that is substantially trapezoid-shaped. In particular, the irrigation system 510 shows two sets of first and second joints 518,519 located at opposing ends of the irrigation system 510. The ability to pivot and place the support structures in folded configurations at both ends of the irrigation system 510 allows the span of the irrigation system 510 to be shortened and lengthened at both ends thereof to cover the trapezoid-shaped field 512.

Specifically, FIG. 8 illustrates the irrigation system 510 with pivotable support structures 530,532 at both ends thereof in the folded configuration at a starting point 540. FIG. 8 also illustrates the irrigation system 510 with the pivotable support structures 530,532 at both ends thereof in a partially-unfolded configuration at an ending point 542. Note that the irrigation system 510 with two sets of joints 518,519 located at opposing ends thereof may be used in any field having side boundaries that are not substantially perpendicular with end boundaries of the field or in which a width of the field varies at one or more locations thereof.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A lateral move irrigation system comprising:
   a main section having a first end and a second end and comprising:
      a plurality of main towers configured to travel across a field in a lateral direction, and
      a plurality of main support structures spanning from the first end to the second end of the main section, wherein each of the main support structures is attached to at least one of the main towers;
   a first end section comprising:
      a first pivotable support structure pivotally attached to one of the main support structures at the first end of the main section, and
      a second pivotable support structure pivotally attached to the first pivotable support structure;
   a second end section comprising:
      a third pivotable support structure pivotally attached to one of the main support structures at the second end of the main section, and
      a fourth pivotable support structure pivotally attached to the third support structure;
   a fluid delivery system comprising one or more conduits attached to or extending through at least a portion of the support structures and configured to output water from orifices formed therein;
   a first sensing device connected at or proximate to the first end and configured to sense its geographic coordinates or one or more field boundaries;
   a second sensing device connected at or proximate to the second end section and configured to sense its geographic coordinates or one or more field boundaries; and
   a control system configured to:
      pivot the first and second pivotable support structures in response to signals received from the first sensing device at one or more locations of a field that are not passable by the irrigation system when at least one of the first and second pivotable support structures are laterally aligned with the main support structures to thereby decrease an effective length of the irrigation system to permit passage of at least a portion of the irrigation system, and
      pivot the third and fourth pivotable support structures in response to signals received from the second sensing device at one or more locations of the field that are not passable by the irrigation system when at least one of the third and fourth pivotable support structures are laterally aligned with the main support structures to thereby decrease an effective length of the irrigation system to permit passage of at least a portion of the irrigation system.

2. The irrigation system of claim 1, further comprising:
   a first joint pivotally joining the first pivotable support structure with the main support structures in a substantially horizontal plane;
   a second joint pivotally joining the second pivotable support structure with the third pivotable support structure in a substantially horizontal plane;
   a third joint pivotally joining the third pivotable support structure with the main support structures in a substantially horizontal plane; and
   a fourth joint pivotally joining the third pivotable support structure with the fourth pivotable support structure in a substantially horizontal plane.

3. The irrigation system of claim 1, further comprising at least one actuation device, wherein the at least one actuation device is configured to receive communication signals from the control system and to pivot at least one of the pivotable support structures toward and away from each other.

4. The irrigation system of claim 1, wherein the control system is configured to pivot the first pivotable support structure in an opposite rotational direction than a rotational direction in which the control system pivots the second pivotable support structure, thereby placing the first and second pivotable support structures into a substantially zig-zag or "Z"-shaped configuration relative to at least one of the main support structures.

5. The irrigation system of claim 1, wherein the control system is configured to pivot the third pivotable support structure in an opposite rotational direction than a rotational direction in which the control system pivots the fourth pivotable support structure, thereby placing the third and fourth pivotable support structures into a substantially zig-zag or "Z"-shaped configuration relative to at least one of the main support structures.

6. The lateral move irrigation system of claim 1, wherein the first and third pivotable support structures are each configured to rotate a maximum of approximately 330-degrees relative to the main support structures.

7. The lateral move irrigation system of claim 1, wherein the second pivotable support structure is configured to rotate a maximum of approximately 330-degrees relative to the first pivotable support structure and the third pivotable support structure is configured to rotate a maximum of approximately 330-degrees relative to the fourth pivotable support structure.

* * * * *